June 17, 1969    H. M. POLLAK ET AL    3,450,176

RADIAL ARM MACHINE TOOL

Filed March 22, 1966      Sheet 1 of 2

INVENTORS.
HENRY M. POLLAK
ROBERT S. POLLAK
BY Seidel & Gouda

ATTORNEYS.

INVENTORS.
HENRY M. POLLAK
ROBERT S. POLLAK
BY
ATTORNEYS.

United States Patent Office 3,450,176
Patented June 17, 1969

3,450,176
RADIAL ARM MACHINE TOOL
Henry M. Pollak, 1235 Queen St., and Robert S. Pollak, 1007 N. Warren St., both of Pottstown, Pa. 19464
Continuation-in-part of application Ser. No. 521,388, Jan. 18, 1966. This application Mar. 22, 1966, Ser. No. 536,371
Int. Cl. B27b 27/06
U.S. Cl. 143—6                                              6 Claims

ABSTRACT OF THE DISCLOSURE

A radial arm saw is disclosed wherein the saw and its motor are supported from a reciprocally mounted carriage by means of first and second sleeve members. The sleeve members are split clamps substantially identical in cross section and having an integral mounting plate. The mounting plates are connected to each other so that one sleeve member is horizontally disposed and the other is vertically disposed. The carriage is supported by a cantilever track formed from hollow rectangular tubes. The surfaces of the tubes are angularly disposed in a manner so that wheels on the carriage mounted for rotation about an upright axis are in rolling engagement with the angularly disposed surfaces on the track.

---

This invention relates to a radial arm machine tool, and more particularly, to a radial arm saw.

This application is a continuation-in-part of copending application Ser. No. 521,388 entitled "Radial Arm Saw Support Structure" filed on Jan. 18, 1966, and now Patent No. 3,387,636.

The present invention concerns a machine tool wherein the work piece engaging member is a rotatable saw blade. It is within the scope of the present invention to use a milling cutter, grinding wheel, polishing wheel, or the like in place of a saw blade.

A radial arm saw includes a mechanism which permits a track from which the blade is supported along with its driving mechanism to be positioned relative to the work piece. The saw will have the ability to cut the work piece at a multiplicity of miter angles, bevel angles, and at a multiplicity of depths.

The structure of a radial arm saw must be relatively rigid due to the fact that the track must resist deflection as much as possible. Deflection of the track in a horizontal plane will permit the blade to cut in a direction other than the desired direction. Deflection of the track in the vertical plane will permit the blade to climb up on the work piece rather than cut it. Further, the tendency for the blade to climb up on the work piece causes the blade and its driving mechanism to stall much more easily when the track deflects in the vertical plane.

In order for the saw to make the four basic cuts (rip cut, cross cut, angle cut, and miter cut), the following movements must be provided for:

(a) The blade must raise and lower. This is necessary in order that the variable depths of a cut can be achieved and also in order that the blade can be positioned after rotating it to an angle or in the process of rotating it to an angle.

(b) The track must rotate about an axis perpendicular to the table surface to permit miter cuts.

(c) The blade must rotate about an axis perpendicular to the cutting rotation axis and parallel to the track axis in order to permit bevel angle cuts.

(d) The blade must rotate about an axis perpendicular to both the blade cutting rotation and the track axis in order to position the blade for rip cuts.

On machines commercially proposed heretofore, the motion described at (a) above is obtained by means of a vertical support tube or member between the track and the base of the machine. The vertical support tube is machined to an accurately sized diameter. A holding member also having an accurately sized inner diameter is telescopically supported by the tube up and down sliding motion. Often a gib is provided to remove the final .001 inch clearance between these two members. In addition, some method of keying is provided to prevent rotating motion of the support tube with respect to the base supporting the same.

The movement described in (b) above is obtained on commercial machines by devices similar to those described above with respect to (a). In other designs, a third member is provided between the track and the tube also requiring a close fit between machined surfaces. The motions described in (c) and (d) above are normally obtained by a combination of pins and locks. These motions are provided between the blade carrying carriage and the blade itself.

In our above-mentioned application, a single mechanism in the form of a clamp is provided to accomplish motions (a) and (b). The disclosure in said application is incorporated herein by reference.

In accordance with the present invention motions (c) and (d) are obtained by a single mechanism in the form of a clamp device. This clamp device in a preferred embodiment includes a pair of identical clamps or sleeve members connected back to back and rotated 90° with respect to each other. The clamps are structurally interrelated in a manner whereby they can be extruded for use with commercially available tubing which does not require any machining. The clamps are preferably made from a ductile material and are split clamps. Due to the ductility of the clamp, substantially one hundred percent of the inner peripheral surface of the clamp will be in contact with the outer periphery of commercially available tubing. Any out of round surfaces on the tubing will not interfere with the clamping action and will be accommodated by deflection of the segments of the clamp.

An overhead support means is provided for the clamp device and the cutting blade. This overhead support means is preferably in the form of a carriage reciprocally mounted along a track. The track is preferably in the form of commercially available rectangular tubing. The carriage is preferably rollingly contracting the rectangular tubing at points above and below a corner on the tubing. In this manner, versatility is provided in adjusting the riding position of the carriage with respect to the track.

It is an object of the present invention to provide a novel radial arm machine tool.

It is another object of the present invention to provide a novel radial arm saw.

It is another object of the present invention to provide a radail arm saw structurally interrelated in a novel manner so that it may facilitate making the four basic cuts.

It is another object of the present invention to provide a radial arm saw structurally interrelated in a manner which will enable the saw to be constructed more inexpensively than those proposed heretofore while using commercially available tubing.

It is another object of the present invention to provide a radial arm saw structurally interrelated with a carriage mounted for movement along a track in a novel manner.

It is another object of the present invention to provide a radial arm saw which is simple, inexpensive to manufacture, reliable, and easy to maintain.

Other objects will appear hereinafter.

For the purpose of illustrating the invention, there is shown in the drawings a form which is presently preferred; it being understood, however, that this invention is not limited to the precise arrangements and instrumenalities shown.

Figure 1:
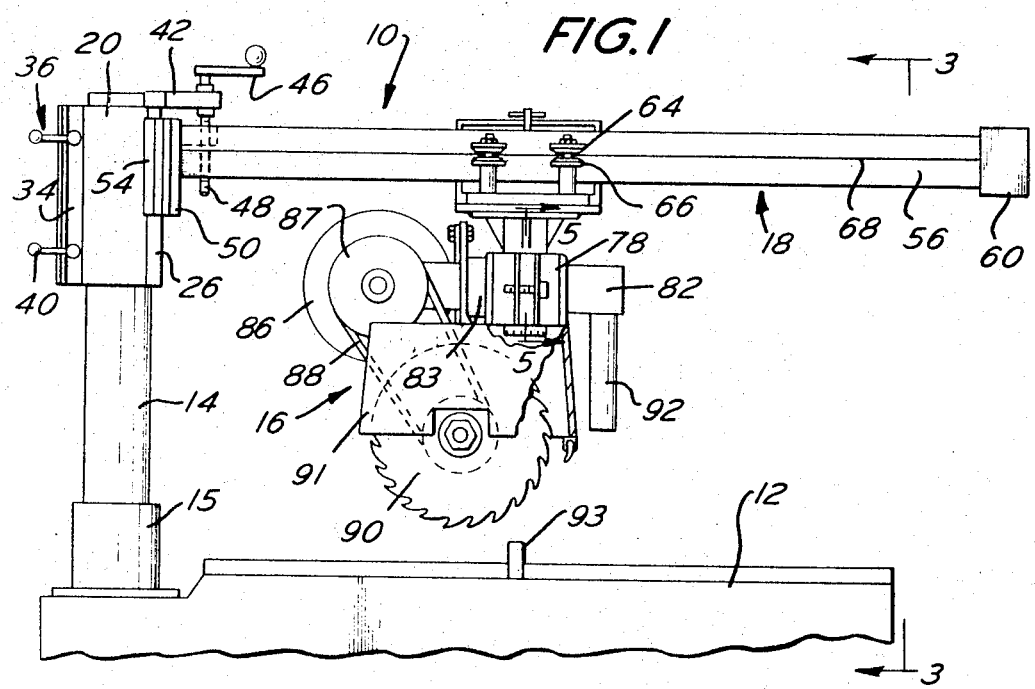
FIGURE 1 is a side elevation view of the radial arm saw.

Referring to the drawing in detail, wherein like numerals indicate like elements, there is shown in FIGURE 1 a radial arm saw designated generally as 10 mounted on or supported by a table 12.

The saw 10 includes a column 14 supported at its lower end by a base 15 which in turn is supported by the table 12. Column 14 should be substantially circular and is preferably a commercially available tubing. A saw designated generally as 16 is supported by a track designated generally as 18. Track 18, as will be made clear hereinafter, is a cantilever arm supported by the column 14.

The track 18 is supported from the column 14 in part by a clamp 20. Clamp 20 is a split clamp and is structurally interrelated in a manner so that it may be extruded from a ductile material such as aluminum. Clamp 20 includes arcuate segments 22 and 24 on diametrically opposite sides of column 14. Segments 22 and 24 are of uniform width and embrace approximately 180° of the outer periphery of column 14. Clamp 20 also includes one-half of a dovetail slide mechanism such as key portion 26. Portion 26 includes tapered side faces which converge toward the column 14.

Clamp 20 includes arms 32 and 34 extending from the free ends of the segments 22 and 24, respectively, in a direction away from the key portion 26. The arms 32 and 34 are at least as thick as the segments 22 and 24 which in turn are substantially thinner than the key portion 26. The distance between the arms 32 and 34 corresponds to approximately 25 to 30 arcuate degrees on the outer periphery of column 14.

A latch means designated generally as 36 is provided to releasably interconnect the arms 32 and 34. In the illustrated embodiment, the latch means includes a pair of threaded members 38, each having a handle 40 connected thereto. Rotation of the handle 40 in one direction will bring the arms 32 and 34 towards each other and in the opposite direction will cause the arms to move away from each other.

In the position illustrated in the drawings, the latch means 36 is causing the arms 32 and 34 to be at their closest point so that the clamp 20 is in engagement with the outer periphery of column 14. Due to the ductility of the segments 22 and 24, intimate contact will be provided between the clamp 20 and column 14 regardless of the fact that the column 14 may be slightly out of round. A radially outwardly directed pin or flange may be utilized, such as by being fixed to column 14, to prevent clamp 20 from sliding down the column from the position illustrated.

A mounting plate 42 is fixedly secured to the upper end of key portion 26 by means of screws or the like. If desired, plate 42 could be welded to the upper end of key portion 26. An adjusting handle 46 is connected to one end of a threaded member 48. Intermediate its ends, member 48 is coupled to the plate 42 by means of a conventional non-rising coupling. Member 48 is threadedly coupled to a mounting block which in turn is supported by a slide plate 50. Slide plate 50 has a keyway on its opposite face and forms the female half of the dovetail slide mechanism. The key portion 26 is received within the keyway.

Figure 2:
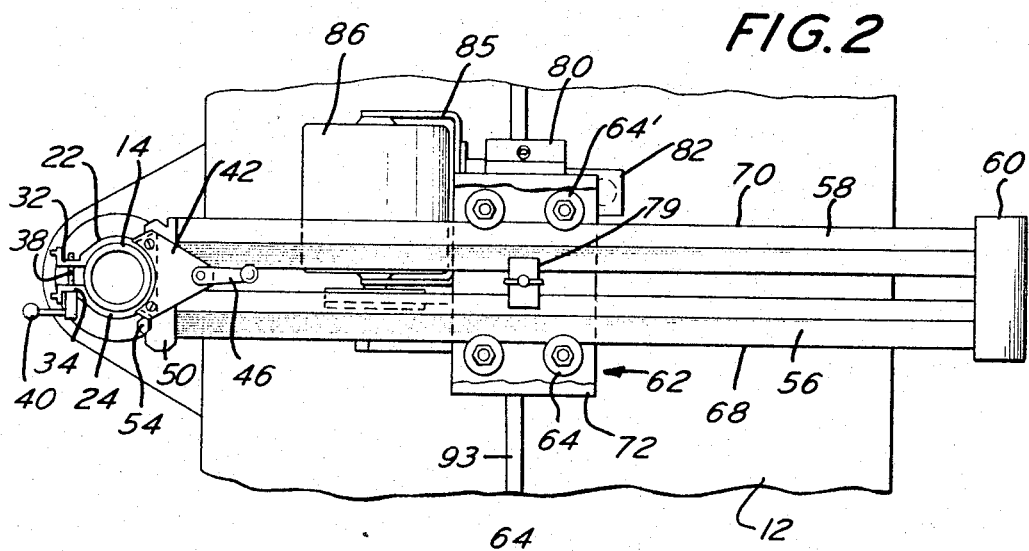
FIGURE 2 is a top plan view of the saw illustrated in FIGURE 1.

A gib 54 is adjustably supported by the slide plate 50. Gib 54 is hexagonal in cross section as illustrated more clearly in FIGURE 2 and has one face overlying and in contact with a side face on the key portion 26 as well as a tapered face on the slide plate 50. Gib 54 is threadedly coupled to the slide plate 50 and shims may be disposed therebetween. Threaded bolts may be utilized for this purpose. In this manner, an accurate machined fit between the male and female components of the dovetail mechanism need not be provided. In a preferred embodiment, the components of the dovetail mechanism are extruded components of uniform cross section or design so that little or no machining or secondary operations are required.

The track 18 includes first and second parallel tubes 56 and 58 in the form of cantilever arms supported at one end by the slide plate 50. Tubes 56 and 58 are commercially available tubes and are preferably rectangular or correspond to an equilateral triangle in cross section. As is apparent from the drawing, the tubes are spaced from one another and the ends of the tubes remote from the slide plate 50 are connected together by a head 60. Screws or bolts may be utilized to removably interconnect the head 60 with the ends of tubes 56 and 58.

Figure 3:
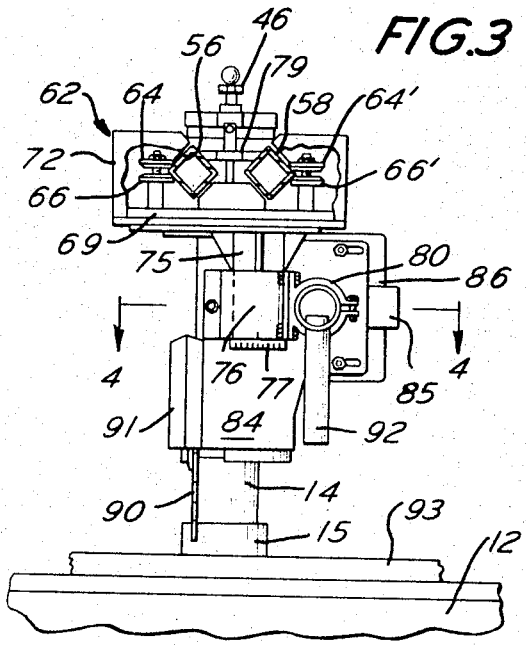
FIGURE 3 is an elevation view taken along the line 3—3 in FIGURE 1.

A carriage designated generally as 62 is mounted for reciprocation along the track 18. As shown more clearly in FIGURES 1–3, the carriage 62 is provided with two sets of wheels in rolling engagement with tube 56 and two sets of wheels in rolling engagement with tube 58. Since the sets of wheels are identical, only one of the sets engaging tube 56 will be described in detail. The corresponding set for rolling engagement with tube 58 is provided with corresponding primed numerals.

Each set of wheels includes an upper wheel 64 and a lower wheel 66 mounted for rotation about a vertical axis. The wheels are mounted on vertical posts extending upwardly from a floor or bottom wall 69 on the carriage 62. The wheels 64 and 66 are spaced from one another and in rolling contact with the walls of tube 56 on opposite sides of the corner 68. The wheels 64' and 66' are likewise disposed with respect to the corner 70 on the tube 58.

A threaded nut is provided on post 63 for adjusting the vertical distance between the wheels 64 and 66 and thereby provide a limited adjustment for the vertical disposition of the carriage 62 with respect to the track 18. This adjustment will facilitate taking up slack between the wheels. A housing 72 is provided as part of the carriage 62 and encloses the sets of wheels. A block 79 of wood or other suitable material is disposed between tubes 56 and 58 and is supported by the carriage bottom wall 69. A bolt 97 is threaded to said wall and said block 79. Rotation of bolt 97 by means of any convenient handle attached thereto or separable therefrom will cause the block 79 to move upwardly into engagement with tubes 56 and 58 of the track 18 and act as a selectively operable brake or lock between the track 18 and the carriage 62.

Figure 5:
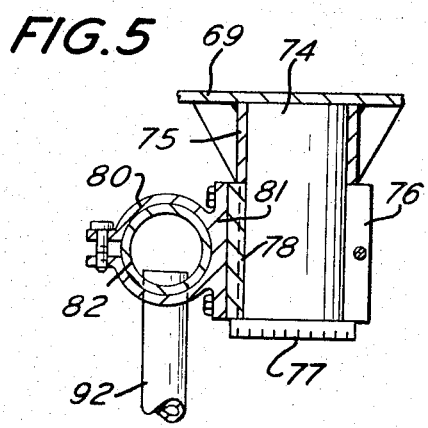
FIGURE 5 is a sectional view taken along the line 5—5 in FIGURE 1.
Figure 4:
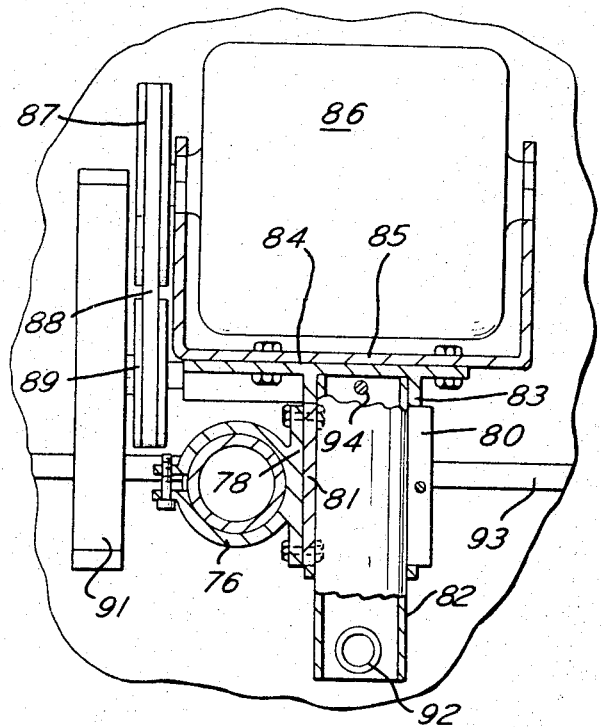
FIGURE 4 is a sectional view taken along the line 4—4 in FIGURE 3.
Figure 6:
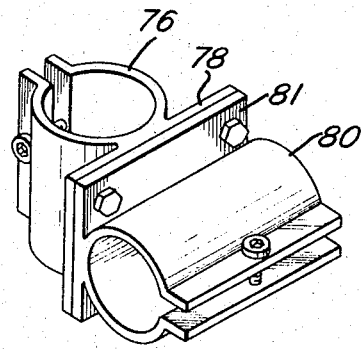
FIGURE 6 is a perspective view of the novel clamp device which is part of the present invention.

A post 74 is supported in depending relation from the bottom wall 69 of the carriage 62 as shown more clearly in FIGURE 5. A bearing sleeve 75 is fixedly secured to the lower surface of the bottom wall 69 around the post 74. A sleeve member such as split clamp 76 embraces the post 74 and is in end-to-end engagement with the bearing sleeve 75. And end cap 77 is provided on the post 74 with an flange extending to a position so that it overlaps at least in part the end face of the clamp 76. Post 74 is preferably a hollow commercially available tube.

Another sleeve member such as clamp 80, identical with clamp 76, is fixedly secured thereto. Thus, clamp 76 is provided with a mounting plate 78 connected back-to-back with a mounting plate 81 on the clamp 80. The longitudinal axis of clamp 76 is vertical. The longitudinal axis of clamp 80 is horizontal. The clamps may be fixedly but removably secured together by screws, bolts or the like. Each of these clamps are made from the same ductile material such as aluminum and are uniform in cross section so that they may be extruded.

Clamp 80 embraces a hollow tube 82. Tube 82 has one end extending into a boss 83 on a plate 84. An end face on the boss 83 is in engagement with an end face on the clamp 80. A retaining ring or other clamping device may be disposed around the tube 82 in engagement with the opposite end face of the clamp 80. A bolt 94 or the like removably but rigidly connects the tube 82 with the boss 83.

A bracket 85 is removably connected to the plate 84. A motor 86 is supported by the bracket 85. A plurality 87 on the output shaft of the motor 86 is engaged peripherally by an endless belt 88. Belt 88 extends around a pulley 89. Pulley 89 is mounted on a shaft which includes the cutting blade 90.

A guard 91 may be provided for the upper half of the cutting blade 90. The bearing housing for the shaft which supports the blade 90 and pulley 89 is supported at the lower end of the plate 84. A handle 92 in the form of a hollow pipe has one end fixedly secured to the tube 82. A conventional rip fence 93 is supported by the table 12.

Figure 7:
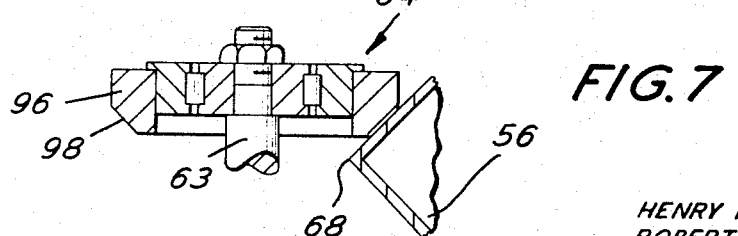
FIGURE 7 is an enlarged sectional view of a carriage wheel.

As shown more clearly in FIGURE 7, wheel 64 (which is identical to the other wheels) is preferably in the form of a double race ball bearing unit. A tire 96 surrounds the outer race and abuts a flange thereon. Tire 96 has a beveled surface 98 for rolling contact with tube 56 above corner 68. Tire 96 is preferably made from a soft material such as aluminum so that it rather than tube 56 will wear during use. Vertical adjustment of the carriage wheels such as wheel 64 due to wear of tire 96 or due to machining and assembling tolerances may be accomplished by adjusting the nut at the upper end of post 63.

The carriage 62 and all of the components supported therefrom including the blade 90 are reciprocated along the track 18 by manually moving the handle 92 in the desired direction parallel to the longitudinal axes of the tubes 56 and 58. A bevel or angle crosscut may be obtained by tilting the saw blade 90 to the precise desired angle. This is accomplished by rotating the handle 92 and tube 82 about the longitudinal axis of tube 82. It will be obvious that the motor 86 also will be disposed at the same angle as the axis of rotation for the blade 90 due to the fact that tube 82, plate 84 and bracket 85 are all rigidly interconnected.

The blade 90 may be rotated through an arc of 360° by moving the handle 92 in an arc about the longitudinal axis of post 74. By unloosening the clamp 20, the track 18 may be rotated with respect to column 14 to any desired position. This will permit the saw blade 90 to make miter cuts. By adjusting handle 46, the blade 90 may be raised or lowered as desired.

When constructed in a manner as described above, the radial arm saw 10 may be manufactured more economically than those proposed heretofore while having all the structural requirements of such saws and providing the accuracy and tolerances acceptable to the trade. Since the clamps 76 and 80 are extruded, the only machining required is to drill the holes for interconnecting the clamps and the holes in connection with the bolts which is threadedly coupled to the arms at the split. If desired, graduations or indicia may be provided on the outer periphery of end cap 78 for cooperation with a mating graduation on the clamp 76.

The present invention may be embodied in other specific forms without departing from the spirit or essential attributes thereof and, accordingly, reference should be made to the appended claims, rather than to the foregoing specification as indicating the scope of the invention.

We claim:

1. In a radial arm machine tool comprising first and second sleeve members connected together so that one member is vertically disposed and the other member is horizontally disposed, said members being substantially identical in cross section, each member being a split clamp having an integral mounting plate portion, the mounting plate portions being connected to each other, a motor-operated rotatably supported work-engaging tool, said tool being supported by said horizontally disposed member, an overhead support means, a carriage, said carriage having wheels rotatably supported by said overhead support means, and said vertically disposed member being supported in depending relation from said carriage.

2. In a machine tool in accordance with claim 1 wherein said clamps being made from a ductile material.

3. In a radial arm machine tool comprising first and second sleeve members connected together so that one member is vertically disposed and the other member is horizontally disposed, a motor-operated rotatably supported work-engaging tool, said tool being supported by said horizontally disposed member, an overhead support means rotatably coupled to said vertically disposed member in a manner facilitating movement of said members along the support means, a tube embraced by said horizontally disposed member, said tube being coupled to a support, a motor for operating said tool, said support supporting said motor and said work-engaging tool, said work-engaging tool being a sawblade mounted for rotation about an axis perpendicular to the axis of said members, and a handle connected to said tube for positioning the blade at a location where a cut is desired to be made.

4. In a machine tool in accordance with claim 3 including a carriage, said carriage having wheels rotatably supported by said overhead support means, each of said sleeve members being split clamps having an integral mounting plate portion, the mounting plate portions being connected to each other, and said vertically disposed member being supported in depending relation from said carriage.

5. In a machine tool in accordance with claim 1 wherein said overhead support means includes parallel hollow members of uniform cross section having a periphery defined by intersecting sides, all sides being angled with respect to a horizontal plane, and said carriage wheels being rotatably supported by some of said sides.

6. In a machine tool in accordance with claim 3 wherein said overhead support means are parallel hollow tubes of rectangular cross section, said tubes being cantilever arms, and a head interconnecting the free ends of said tubes.

References Cited

UNITED STATES PATENTS

| | | |
|---|---|---|
| 1,748,446 | 2/1930 | Gatzsch. |
| 2,291,999 | 8/1942 | Wilson et al. |
| 2,422,843 | 6/1947 | Mooradian. |
| 2,489,420 | 11/1949 | Kirk et al. |
| 1,867,275 | 7/1932 | McCarter. |

FOREIGN PATENTS

| | | |
|---|---|---|
| 806,663 | 12/1958 | Great Britain. |

DONALD R. SCHRAN, *Primary Examiner.*